(12) United States Patent
Chowdhury et al.

(10) Patent No.: US 10,387,217 B2
(45) Date of Patent: Aug. 20, 2019

(54) DISTRIBUTED PROCESSING OF MIXED SERIAL AND CONCURRENT WORKLOADS

(71) Applicant: CA, Inc., Islandia, NY (US)

(72) Inventors: Mubdiu Reza Chowdhury, Islandia, NY (US); Greg Coonrod, Islandia, NY (US); Avaneesh Srivastav, Islandia, NY (US); Bilal M. Bhatti, Islandia, NY (US)

(73) Assignee: CA, Inc., Islandia, NY (US)

( * ) Notice: Subject to any disclaimer, the term of this patent is extended or adjusted under 35 U.S.C. 154(b) by 359 days.

(21) Appl. No.: 15/433,335

(22) Filed: Feb. 15, 2017

(65) Prior Publication Data

US 2018/0232259 A1 Aug. 16, 2018

(51) Int. Cl.
*G06F 9/46* (2006.01)
*G06F 9/52* (2006.01)
*G06F 9/48* (2006.01)

(52) U.S. Cl.
CPC .............. *G06F 9/52* (2013.01); *G06F 9/4881* (2013.01)

(58) Field of Classification Search
None
See application file for complete search history.

(56) References Cited

U.S. PATENT DOCUMENTS

| | | |
|---|---|---|
| 2002/0150079 A1 | 10/2002 | Zabawskyj et al. |
| 2007/0127683 A1 | 6/2007 | Zabawskyj et al. |
| 2011/0218792 A1 | 9/2011 | Whisnant et al. |
| 2012/0102501 A1* | 4/2012 | Waddington .......... G06F 9/5061 718/105 |
| 2016/0012891 A1 | 1/2016 | Intrater et al. |
| 2016/0110220 A1* | 4/2016 | Gralhoz .................... G06F 8/38 718/102 |
| 2016/0323378 A1 | 11/2016 | Coskun et al. |
| 2016/0337226 A1 | 11/2016 | Padala et al. |
| 2016/0342395 A1 | 11/2016 | Kukolich et al. |
| 2016/0357958 A1 | 12/2016 | Guidry |
| 2017/0017476 A1 | 1/2017 | Ebcioglu et al. |

(Continued)

OTHER PUBLICATIONS

Parts of an Amazon SWF Application', http://web.archive.org/web/20150908132345/http://docs.aws.amazon.com/amazonswf/latest/awsrbflowguide/concepts-parts.html, Sep. 8, 2015, pp. 1 to 3.

(Continued)

*Primary Examiner* — Bradley A Teets
(74) *Attorney, Agent, or Firm* — Pillsbury Winthrop Shaw Pittman LLP

(57) ABSTRACT

Provided is a process, including: obtaining a task tree; traversing the task tree to obtain an unordered set of tasks and an ordered list of tasks; adding the unordered set of tasks to at least some of a plurality of queues of tasks; adding the ordered list of tasks to at least some of the plurality of queues of tasks; and receiving a first task request from a first worker process in a concurrent processing application and, in response to the first task request: accessing a first queue from among the plurality of queues, determining that the first queue is not locked, accessing a first task in the first queue in response to the first task being a next task in the first queue, determining that the first task is a member of a sequence of tasks specified by the ordered list and, in response, locking the first queue, and assigning the first task to the first worker process.

24 Claims, 5 Drawing Sheets

(56) References Cited

U.S. PATENT DOCUMENTS

2017/0024449 A1 1/2017 Wesley, Sr. et al.
2017/0038919 A1 2/2017 Moss et al.
2017/0041406 A1 2/2017 Lawson et al.

OTHER PUBLICATIONS

Introducing Resque', https://github.com/blog/542introducingresque, Nov. 3, 2009, pp. 1 to 8.
Resque / README.markdown', https://github.com/resque/resque/blob/master/README.markdown, Jul. 7, 2016, pp. 1 to 25.
Simple, Organized Queueing with Resque', https://www.sitepoint.com/simple-organized-queueing-with-resque/, Jun. 4, 2012, pp. 1 to18.
Tutorial: Design and implementation of a simple Twitter clone using PHP and the Redis key-value store', https://redis.io/topics/twitter-clone, Jul. 7, 2016, pp. 1 to 21.
Abstract syntax tree', Wikipedia, http://web.archive.org/web/20170115154525/https://en.wikipedia.org/wiki/Abstract_syntax_tree, Jan. 15, 2017, pp. 1 to 4.
Reflection (computer programming)', Wikipedia, https://web-beta.archive.org/web/20170109191118/https://en.wikipedia.org/wiki/Reflection_(computer_programming), Jan. 9, 2017, pp. 1 to 5.

* cited by examiner

DISTRIBUTED PROCESSING OF MIXED SERIAL AND CONCURRENT WORKLOADS

BACKGROUND

1. Field

The present disclosure relates generally to distributed computing and, more specifically, to distributed processing of mixed serial and concurrent workloads.

2. Description of the Related Art

Distributed workload platforms are often used to allocate, track, and otherwise manage work being performed concurrently (e.g., at overlapping times) and asynchronously by a relatively large number of computers or computer process threads (e.g., often more than 20). Many computer workloads are too large or too latency sensitive to execute in a single thread on a single computer in sufficient time. For example, this is true of many batch processes on large data sets or those with many replications of relatively slow operations. Often such workloads are amenable to a divide and conquer approach, whereby a workload is broken up into a relatively large number of tasks, and those tasks are distributed among a relatively large number of computing processes that operate asynchronously and concurrently on the tasks. With this approach, results are often expedited, and relatively large problems are rendered tractable.

This divide and conquer approach often gives rise to a surprising amount of complexity. In many cases, the processes to which tasks are assigned need to be provisioned, tracked, recovered, coordinated, and otherwise managed in the event of equipment or process failure. Additional complexity arises from messaging between processes over often unreliable networks and with often unreliable computing devices. To address these issues, industry has developed a variety of different types of distributed workload platforms that shield the developer from much of this complexity, while giving the developer the benefit of concurrent processing. Examples include various frameworks, like Hadoop™, Spark™, Flink™, Storm™, and Sidekiq™, and libraries, like ResQue™.

Generally, many distributed processing platforms execute tasks without regard to whether a particular subset of the tasks must be executed in sequence. Further, the tasks tend to be rigidly defined at the outset of a process. This makes such systems difficult to use when some tasks must be performed sequentially (while still benefiting from the advantages of multi-threaded or distributed processing) and when the tasks branch conditionally. These aspects can create issues when existing platforms interact with remote, third-party applications.

Recently, many software applications have migrated to the cloud. Often, user-facing and back-end software applications execute on remote computer systems hosted by various third parties. Examples include productivity suites, calendaring applications, email, document management platforms, enterprise resource planning applications, project management applications, and various databases.

Frequently, these applications support programmatic access (e.g., to retrieve data, write data, delete data, or execute other commands) via an application-program interface (API). Generally, APIs have a structure similar to a function call from one part of a program to another (e.g., with an identifier of the function and various parameters), except that the API command is often sent to another computer system over a network, and the client is often constrained by the functionality the API developer chooses to expose. APIs are not unique to cloud applications, as many on-premises installations also present APIs, and APIs are also used to communicate between programs on a single computing device.

APIs, however, often do work well with client-side (from the perspective of the API) concurrency. These interfaces often not expose server-side tools like deferreds, futures, or promises used to manage concurrent asynchronous operations within a single system, e.g., fully under the control of a single entity able to coordinate operations with more granularity and complexity. As a result, the concurrency afforded by many distributed workload platforms is not well suited for rich interactions with third party APIs. Due to APIs often relatively-constrained interfaces, the techniques used to deal with concurrent asynchronous operations in a single computer system, under the control of a single entity, do not translate well when third party API access is part of those operations, particularly when a diverse set of third party APIs are involved and when the operations branch conditionally.

SUMMARY

The following is a non-exhaustive listing of some aspects of the present techniques. These and other aspects are described in the following disclosure.

Some aspects include a process, including: obtaining a task tree, the task tree including a plurality of tasks arranged in a tree data structure; traversing the task tree to obtain an unordered set of tasks and an ordered list of tasks; adding the unordered set of tasks to at least some of a plurality of queues of tasks; adding the ordered list of tasks to at least some of the plurality of queues of tasks; receiving a first task request from a first worker process among a plurality of worker processes in a concurrent processing application distributed among multiple processors and, in response to the first task request: accessing a first queue from among the plurality of queues, determining that the first queue is not locked, accessing a first task in the first queue in response to the first task being a next task in the first queue, determining that the first task is a member of a sequence of tasks specified by the ordered list and, in response, locking the first queue, and assigning the first task to the first worker process; and receiving a second task request from a second worker process among the plurality of worker processes, the second worker process being a different process from the first worker process, and, in response to the second task request: accessing the first queue, determining that the first queue is locked and, in response, accessing a second queue from among the plurality of queues, accessing a second task in the second queue in response to the second task being a next task in the second queue, determining that the second task is a member of the unordered set of tasks and, in response, determining to not lock the second queue, and assigning the second task to the second worker process.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
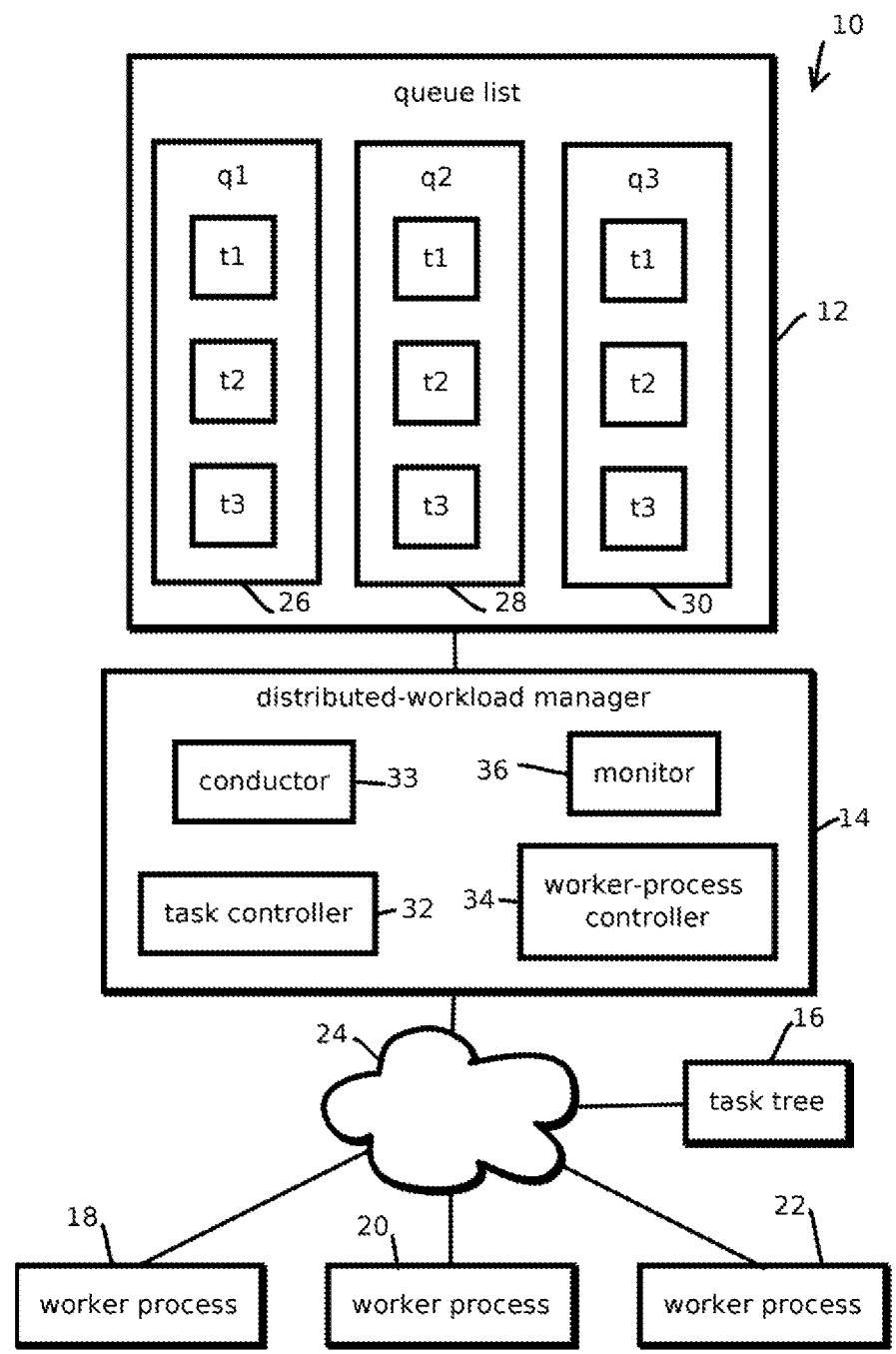
FIG. 1 is a schematic diagram of an example of a distributed workload platform in accordance with some of the embodiments of the present techniques.

While the disclosed techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the disclosed techniques to the particular form disclosed, but to the contrary, the intention is to cover all modifications, equivalents, and alternatives falling within the spirit and scope of the present disclosed techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer science. Indeed, the inventors wish to emphasize the difficulty of recognizing those problems that are nascent and will become much more apparent in the future should trends in the distributed workload platform field continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

To mitigate some of the above-described issues, or others, some embodiments designate sets of tasks as sequential and execute them in sequence, while executing other tasks concurrently. To effectuate these operations at scale, some embodiments maintain multiple queues of tasks, with some queues containing sequential tasks. Some embodiments may lock the sequential queues while a given task in the queue is being executed to prevent another worker process from executing a subsequent task in the sequential queue concurrently. The serial steps may be performed by different worker processes (unlike a single-threaded application). Further, some embodiments dynamically create these queues based on data obtained during processing. Some embodiments construct task plan graph (or other type of task tree), and crawl the tree, expanding nodes in some cases based on results of processing. Thus, some embodiments may afford the benefits of distributed, concurrent processing while honoring sequential processing constraints. That said, embodiments are not limited to systems that provide this benefit, as several independently useful techniques are described, and cost and engineering tradeoffs are envisioned, none of which is to suggest that any other feature described herein is not also amenable to variation or omission. These and other features are better understood in view of example embodiments.

FIG. 1 is a block diagram that shows an example of a distributed workload processing platform 10 configured to execute collections of tasks that include a mix of ordered lists of tasks and unordered sets of tasks. In some embodiments, the platform 10 may include a queue list 12, a distributed workload manager 14, a task tree 16, worker processes 18, 20, and 22, and a network 24, such as the Internet or various other local area networks, like in a data center. In some embodiments, the illustrated components may be instantiated on a single computing device, for instance with different threads corresponding to the different worker processes 18, 20, and 22, and the distributed workload manager 14. But in many commercial embodiments, is expected that the types of computing operations performed will warrant substantially more computers and substantially more processing power than that shown in FIG. 1. For example, the platform 10 may include more than 5, and in many cases more than 50 computing devices, each executing a distinct operating system (or multiple operating systems in different virtual machines), many of which executing a plurality of concurrently executed, asynchronous worker processes.

The schematic representation of FIG. 1 includes both computing modules 14, 18, 20, and 22, as well as data structures 12 and 16 upon which these modules operate. The modules are best understood in view of the data model by which some embodiments are implemented.

In some embodiments, the queue list 12 may include a plurality of queues, such as queues 26, 28, and 30, also labeled q1, q2, and q3 respectively. Three queues are shown, but it is expected that commercial implementations will likely include substantially more, for instance, more than 5, and in some cases, more than 50 queues. In some embodiments, the queues are first in first out queues, or some embodiments may include last in first out queues, or a combination.

In some embodiments the queues are more loosely ordered, e.g., the queues may be pools of tasks with priorities assigned. In some embodiments, various techniques are used to determine which item in a queue is processed next, beyond the order in which the items were added to the queues. For instance, some embodiments may assign priority scores to tasks, and those tasks may be processed in order of priority, or based on a weighted combination of priority and age, such that older and higher priority task tend to be executed near in the future.

In the illustrated example, each queue 26, 28, and 30 includes three tasks, t1, t2, and t3, but it should be appreciated that embodiments are consistent with, and commercial implementations are likely to include, substantially more tasks, for instance more than 20 or 100 tasks per queue, on average. In some embodiments, tasks may be added to the queues with a process described below with reference to FIG. 2.

In some embodiments, the queue list may be implemented in an in-memory key-value data store that mitigates some problems with many traditional data stores when used with distributed systems performing concurrent, asynchronous operations. In some embodiments, the queue list is implemented as a Redis™ key-value data store that also serves as a cache manager and message broker within the system. In some embodiments, certain operations performed upon data in the data store may be implemented as atomic operations, such that the operation corresponds to a single command or line of code in a scripting language of the data store. As a result, in some embodiments, the corresponding operations may be complete before subsequent operations are performed, thereby reducing the likelihood of race conditions. For instance, a single atomic command may correspond to adding or removing an entry within a queue. In contrast, some traditional systems may process a queue by first determining a next item in the queue, and then instruct the queue to add an additional item or remove the next item relative to that determine next item. In many of these traditional systems, between those two steps, a different process may interact with the queue and change the current state, for instance adding or removing item, and making the determined next item in accurate. Such issues are expected to be less likely to arise with atomic operations, though embodiments are not limited to systems that provide atomic operations, which is not to imply that any other feature may not be omitted in some embodiments.

In some embodiments, the queues in the queue list may also be arranged in order, like in a circular buffer, where each queue has a queue identifier and a pointer to a next queue in the queue list, with the last queue in the queue list pointing back to the first queue. Or in some embodiments, the queues may be arbitrarily arranged, for instance, in a pool with nominal identifiers and priority values indicating which queues should be pulled from first. In some embodiments, some of the queues may be higher priority queues than other queues, and tasks may be assigned based on the task priority to match the queue priority. For instance, q1 may be a high priority queue, and high priority tasks may be assigned to q1 as a result. And worker processes may attempt to pull tasks from q1 before the other queues. Or in some embodiments, the queues may be arranged by age, for instance, with a pointer to a circular buffer of queues indicating where newer tasks are to be added, and with another pointer indicating where tasks are to be removed, with the two pointers incrementing among the queues either periodically or based on queues being filled or emptied.

In some embodiments, the queue list may be maintained as an in memory queue list, for instance on a same computing device, in a same memory address space, as a computing device instantiating the distributed workload manager 14, to facilitate relatively low latency and fast access to tasks in the queue lists. Or some embodiments may distribute the queue list among a plurality of computing devices to provide resiliency to failure of one device. Some embodiments may persist the queue list to storage, for instance, periodically as a backup for recovery in the event that the corresponding computing device fails. Some embodiments may operate exclusively upon queue list maintained in storage to provide potentially slower, but more resilient records of tasks being processed.

In some embodiments, each queue may include a range of memory allocated to the queue, a pointer to a next task to be processed in the queue, and a pointer to a last task added to the queue, indicating where subsequent tasks are to be added to the queue. Further, in some embodiments, each queue may include a binary value indicating whether the respective queue is locked. Upon locking a given queue, tasks may be added to that queue, but not removed from that queue, until the queue is unlocked, in some embodiments.

Queues may be locked in response to encountering a sequence of tasks in the queue that are part of an ordered list of tasks that are to be executed sequentially, such that one task in the sequence is completed, before the next task in the sequence is executed. Thus, in some embodiments, some of the queues 26, 28, and 30 may be locked some of the time, for instance when an ordered list of tasks is encountered in the queue, before the respective tasks are finished being completed. In contrast, when a next task in the queue is not part of an ordered list, or is a last item in an ordered list, that task may be removed from the queue and sent for processing, without the queue being locked in response. Thus, within a given queue, when processing unordered sets of tasks, some, and in some cases many (e.g. two, three, four, 10, or more) of the tasks within a given queue may be removed from the queue and assigned to worker processes for execution concurrently, before any of those tasks have completed processing, thereby maintaining the advantages of the above-described divide and conquer approach, while still accommodating ordered list of tasks.

In some cases, some of the queues may include a mix of ordered lists and unordered sets of tasks; some of the queues may include only unordered sets of tasks; some of the queues may include only ordered lists of tasks. In some cases, the queue list may queues of each of these variants, e.g., each permutation. Thus, some queues may be locked, while multiple tasks are pulled from other queues for concurrent processing.

Examples of specific applications that give rise to a mix of unordered sets of tasks and ordered sequences of tasks are described below with reference to FIG. 4. In some embodiments, the applications include a substantial number of tasks that are not conditional upon the result of one another and, thus, can be executed concurrently, without waiting on one task to complete so that another task may be started. In some embodiments, these applications may also generally include a mix of ordered list of tasks, for instance where the result of one task is relevant to another task being properly executed. In some embodiments, the mix arises from programmatically interacting with a third-party API, like in a software-as-a-service (SaaS) application.

A variety of different techniques may be used to lock the queues. In some embodiments, a spin lock, mutex, or semaphore may be associated with each queue, and the spin lock, mutex, or semaphore may be engaged (changed to a locking state) in response to determining that a given task being pulled from the queue is followed by another task that is part of the same ordered list of tasks as the given task, e.g., that the next task should not begin until the given task is complete.

In some embodiments, the distributed workload manager 14 may instantiate, manage, and monitor the operations of the worker processes 18, 20, and 22, as the worker processes pull tasks from the queue list 12 and execute (or fail to execute) those tasks. Further, the distributed-workload manager 14 may retrieve tasks from the task tree 16 and add those tasks to the appropriate queue in appropriate places within the queue list 12, for instance based on the various queuing rules discussed above.

In some embodiments, the distributed-workload manager 14 includes a task controller module 32, a conductor module 33, a worker process controller module 34, and a monitor 36. In some embodiments, the task controller 32 may maintain an inventory of which tasks have been claimed by (or otherwise assigned to) which worker process, how long the task is been running (e.g., a start-time timestamp), whether the worker process has returned a successful completion result, or whether the worker process has returned a signal indicating that the process failed. In some embodiments, the task controller 32 may periodically iterate over this list and determine whether any processes have exceeded a threshold execution duration time for a given task. Upon such a determination, the task controller 32 may augment the record for that task to indicate that the assignment of the task to the worker process has been invalidated, and the task controller 32 may add the task back into the queue list 12 to be processed by a different worker process. Invalidated results may be discarded, in some embodiments. Some embodiments may track an amount of times each task is invalidated, compare the amount to a threshold, and throw an error or log an alert in response to the threshold being exceeded.

In some embodiments, the conductor 33 may process the tasks tree 16 to add new tasks to the queue list 12. In some embodiments, the task tree 16 is a data structure from which one or more hierarchical graphs of tasks may be obtained. In some embodiments, the task tree 16 is an abstract syntax tree or a concrete syntax tree emitted from a parser that has processed a script in which a workload is encoded for the distributed workload manager 14. In some embodiments, the task tree 16 is a domain specific programming language, such as one encoded in a hierarchical serialized document like extensible markup language (XML) or JavaScript object notation (JSON) describing the operations to be performed.

In some embodiments, the conductor 33 is configured to traverse the task tree 16, for instance with a depth-first traversal (or breadth first traversal) of the task tree. In some instances, the conductor 33 may include a traversal module that recursively calls itself with each child node of a current node (e.g., a node listed as a current node in a call to the traversal module) of the task tree 16, and the recursive module may add tasks to the queue list 12 based on the current node with which it was called. In some embodiments, some of those nodes may include conditional branches or operations that are otherwise required to be sequential. In some cases, such sequential lists may be explicitly labeled within the task tree 16, and upon encountering such a designation, the corresponding ordered list of tasks may be added to the queue list 12, to an individual queue 26, 28, or 30, with values associated with each task record added to the corresponding queue indicating whether a subsequent task is a member of the same ordered list of tasks. When worker processes encounter these values, the worker process may lock the corresponding queue to prevent other worker processes from operating on subsequent tasks in the ordered list concurrently.

In some embodiments, the worker-process controller 34 may instantiate new worker processes and shutdown worker processes, for instance, dynamically expanding and contracting a pool of worker processes based on need while processing a workload. For example, the worker-process controller 34 may query the queue list 12 for an amount of pending tasks and adjust the amount of worker processes in response. In some embodiments, the adjustment may be more fine-grained and may account for an amount of ordered lists of tasks, which may not necessarily benefit from having more worker processes. Some embodiments may add or remove worker processes based on metrics of a next task due to be received from the queue list 12, for instance based on an average (or other measure of central tendency, like median or mode) time that a unlocked task sits in the queue list as the next task due to be retrieved from a given queue or from the queue list itself. Upon determining that these amounts exceed the threshold duration, some embodiments may instruct other computing devices to instantiate additional worker processes. Worker processes, upon being instantiated (or completing a task) may request a task from the queue (e.g., interrogate the queue list to ascertain a next task, or request some other process to assign a task). Alternatively, some embodiments may monitor an amount of time that worker processes spend waiting for a response to a request for a next task from the queue list (e.g., an amount of time over some trailing duration, on average or based on some measure of central tendency), and upon determining that this amount exceeds a threshold, some embodiments may instruct some of the worker processes to terminate in response. In some cases, worker processes may consume computing power that may be put to other beneficial uses, or some embodiments may maintain a relatively large number of worker processes in an idle state to facilitate relatively fast response times.

In some embodiments, the monitor 36 may determine various metrics based on the values gathered by the task controller 32 and the worker process controller 34. In some embodiments, the monitor 36 is operative to generate a graphical user interface with a dashboard representation of those metrics, such that an administrator can monitor the health and performance of the platform 10.

In some embodiments, the task tree 16 is a graph data structure having a root node and a collection of nodes with parents and child nodes, with some nodes being leaf nodes. The tree may branch, with some nodes having a plurality of children, or the tree may not branch, e.g., taking the form of a linked (or otherwise ordered) list. In some embodiments, the nodes may each be associated with a task. In some embodiments, a task may be encoded in multiple nodes, for instance in an abstract syntax tree or concrete syntax tree emitted from a parser that ingested a script describing the workload in a domain specific programming language.

Or in some embodiments, each node of the tree may correspond to a task. In some embodiments, the task tree may be a hierarchical serialized data format document, like XML or JSON having a nested collection of dictionaries and lists encoding ordered and an ordered tasks. As noted, in some cases, the tasks may be designated as ordered or unordered in the task tree 16. Or some embodiments may determine whether tasks are ordered, e.g., by determining whether other tasks accept as inputs the output of a given task. Some embodiments may include tasks designated as ordered list of tasks, with a corresponding sequence indicated in the task tree. It is important to note that a data structure need not be labeled as a tree or a graph to serve as a task tree data structure. Many other data structures can encode the same hierarchical arrangement of information, including program code and domain specific programming languages that when parsed can generate a task tree in a tree format. These other formats are still task tree data structures if they describe a workload for the platform and encode information that can be transformed into a task tree.

In some embodiments, some operations upon the task tree 16 may cause the conductor 33 to adjust the task tree 16. In some cases, the conductor 33 may rewrite or expand portions of the program in the task tree being executed based on results of other portions of the task tree, e.g., with reflection. For example, some embodiments may execute a task and obtain a result that indicates a set of other tasks need to be performed (e.g., following a conditional branch), and in response, as part of executing that current task, those other tasks may be added to the task tree 16, for instance as child nodes of a given node corresponding to the task that yield of the result.

Changes to the task tree 16 may affect tree traversal in various ways, depending on the embodiment. In some cases, tasks may carry forward and be associated with an identifier of a portion of the task tree 16 from which that task is taken, such that the conductor 33 may identify that portion later when a result of the task is obtained, indicating that the task tree is to be adjusted at the indicated portion. In some embodiments, nodes of the task tree may be labeled as traversed, queued, assigned to a worker process, completed by a worker process, and adjusted based on the result of a worker process, with respective values, such as respective Boolean values indicating state. In some embodiments, multiple processes may concurrently traverse the task tree 16, with a primary traversal working through the tree, and subsequent traversals identifying nodes that have been augmented, for instance, by adding new child nodes as a result of a task being completed, for instance, even after the primary traversal has traversed to another portion of the task tree 16. Some embodiments may iteratively call the recursive traversal module of the conductor 33 with the root node of the task tree and a value indicating a current node of the task tree, and that call may spawn a new instance of the traversal module, which may recursively traverse the task tree 16 and perform subsequently added tasks until the current the current node is reached. Or some embodiments may not dynamically expand the task tree 16 or process dynamic expansions to nodes of the task tree before traversing the tax tree to other portions of the task tree, none of which is to suggest that any other feature described herein may not also be varied in some embodiments.

In some embodiments, each of the worker processes 18, 20, and 22 may be identical processes executing on one or more computers, each having a corresponding thread to facilitate concurrent operation by the various processes on differing tasks. In some cases, each worker process may be configured to query the queue list 12 for a next queue in the queue list 12, determine whether that queue is locked, and request a different queue from the queue list upon determining that the queue is locked. Alternatively, upon determining that the queue is not locked, some embodiments may be configured to request a next task from the corresponding queue, determine whether that next task is associated with a value indicating that a subsequent task in that queue is a subsequent task in an ordered list of tasks including the task that was retrieved, and in response to such a determination, changing a lock state of the corresponding queue to locked. Or, if the next task is not part of an ordered list, some embodiments determine to not lock the queue. Worker processes may then indicate to the task controller the task that was taken, such that the inventory of the task controller may be updated and run-times monitored. The worker process may then execute the task, for instance concurrently with the other worker processes executing their respective tasks.

In some embodiments, the worker processes may be configured to share an API connection credential, like a temporary access token. In some traditional APIs, server-client sessions are maintained, and session-specific security credentials are sent from the server to client. These credentials may be appended to API commands by the process to authenticate the commands and cause the API to cause the target system to act on a corresponding account's data. Such arrangements, however, often prevent sessions from being shared among different computing devices. In some cases, the credentials are uniquely associated with the client device, such that a different client device, e.g., one with a different IP address, cannot use the credentials. Often this is done as security measure, but it can impede concurrent interfaces with an API for a single account in some cases.

To mitigate this issue, some embodiments may implement an OAuth (like OAuth 2) protocol to obtain credentials, and those credentials may be sent to and shared among a plurality of worker processes for a given API. In some embodiments, a worker process may request an access token from an authentication server that is different from the API server, e.g., by sending a password and user name, and the authentication server may respond with an access token. The worker process may share that access token with other worker processes communicating with the same API, and each worker process may append the shared access token to API commands to authenticate the commands, without maintaining session data unique to a given client device. That said, embodiments are also consistent with the older traditional approach.

In some embodiments, the queue list may be accessed via database management system (DBMS) by the other components, e.g., with scripting commands particular to a DBMS. As noted above, the DBMS may support atomic operations to ascertain whether a queue is unlocked, retrieve a next task from the queue, determine whether the next task is followed by a task in the same ordered sequence, and lock the queue if that is the case. In some embodiments, a single atomic operation of the DBMS may perform all of these operations, or some embodiments may make atomic any subset permutation thereof. In some cases, worker processes may asynchronously and concurrently access the DBMS (and the queue list) with such atomic operations to obtain tasks in a concurrency-safe manner, unlike in many traditional systems that are subject to race conditions. That said, embodiments are also consistent with the older traditional approach.

In some embodiments, tasks may be managed by a modified version of an existing distributed workload management platform, like those listed above. In some cases, ordered lists of tasks may be processed in a distributed fashion, with a single given ordered list having tasks assigned serially to different worker processes on different computing devices in some cases. Thus, in a given ordered sequence, e.g., of q2 28, a first task t1 may be assigned to worker process 18, with q2 being placed in a locked state. When worker process 18 finishes t1, the worker process may instruct the DBMS of the queue list 12 to unlock q2. Concurrently, worker process 20 may have instructed the DBMS of the queue list 12 to return a task, and the next task in q2, after unlocking, t2, may be assigned to worker process 20. If t3 is also part of the same ordered sequence, q2 may be re-locked, before worker process 18 requests another task, and worker process 18 may then be assigned a task from another unlocked queue. Thus, even within a given ordered list of tasks, tasks may be distributed among multiple worker processes, in some cases, on different computing devices. Or some embodiments may direct all tasks in given ordered list to the same worker process, e.g., by locking a queue relative to other worker processes by designating the queue as temporarily being assigned exclusively to a given worker process until the current ordered list of tasks has had the last task assigned.

Figure 2:
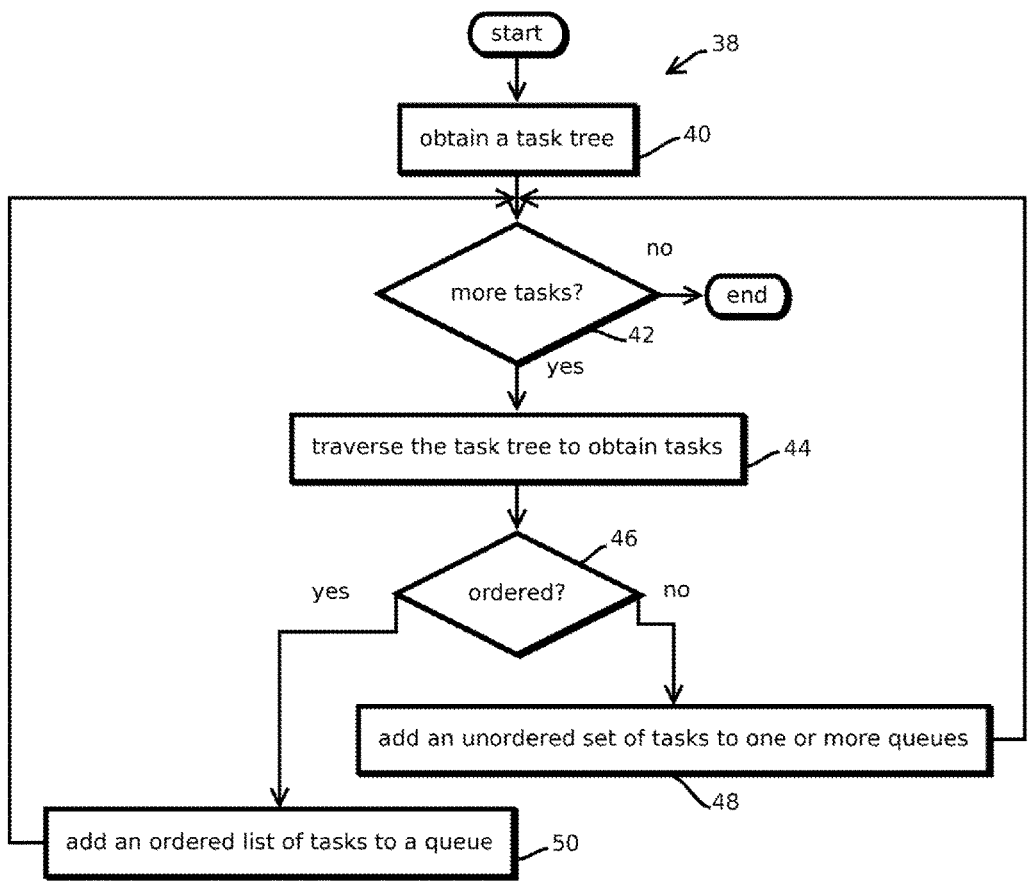
FIG. 2 is a flow chart of an example of a process to load a distributed workload platform with tasks in accordance with some embodiments of the present techniques.

FIG. 2 shows an example of a process 38 that may be performed by some embodiments of the platform 10 described above. In some embodiments, the process 38 may be embodied by instructions, such as program code, stored on a tangible, machine-readable, non-transitory medium, such that when the instructions are executed by one or more processors, the operations described are effectuated. In some cases, the media may be distributed among multiple computing devices, and different processors may execute different described operations, in some cases concurrently in multiple instances. This is true of each of the processes described herein, and other forms of media storing instructions to effectuate the functionality otherwise described herein.

In some embodiments, the process 38 includes obtaining a task tree, as indicated by block 40. In some cases, the task tree may include a plurality of tasks arranged in a tree data structure. As noted, tree data structures need not be labeled as a tree or graph, as the corresponding information may be encoded in a variety of different formats, including program instructions from which an abstract syntax tree or concrete syntax tree may be parsed. For example, some task trees may be formatted as JSON or XML documents encoding a domain specific programming language script. In some embodiments, the task tree may be obtained from another application, such as the one described below with reference to FIG. 4.

Next, some embodiments may determine whether there are more tasks in the task tree, as indicated by block 42. Upon determining there are no more tasks, some embodiments of the process 38 may terminate. Upon determining that there are more tasks, some embodiments of the process 38 may proceed to traverse the task tree to obtain tasks, as indicated by block 44. As noted, this may include a depth first recursive traversal of the task tree. Next, some embodiments may determine whether the obtained tasks are part of an ordered list of tasks (e.g., two or more tasks) or an unordered set of tasks (e.g., a single unordered task). As noted, some embodiments of task trees may include labels designating one or more tasks as unordered or labels designating two or more tasks as ordered and the order in which the tasks are to be performed. Upon determining that the tasks are not ordered 46, some embodiments may add an unordered set of tasks to one or more queues, as indicated by block 48. Alternatively, some embodiments may add an ordered list of tasks to a queue as indicated by block 50, upon determining that the obtained tasks are an ordered list of tasks. In some cases, unordered sets of tasks may be distributed among multiple queues, while a given list of ordered tasks may be added to a single queue. Thus, some embodiments may traverse the task tree and add tasks to the list of queues described above, though embodiments are not limited to that implementation.

Figure 3:
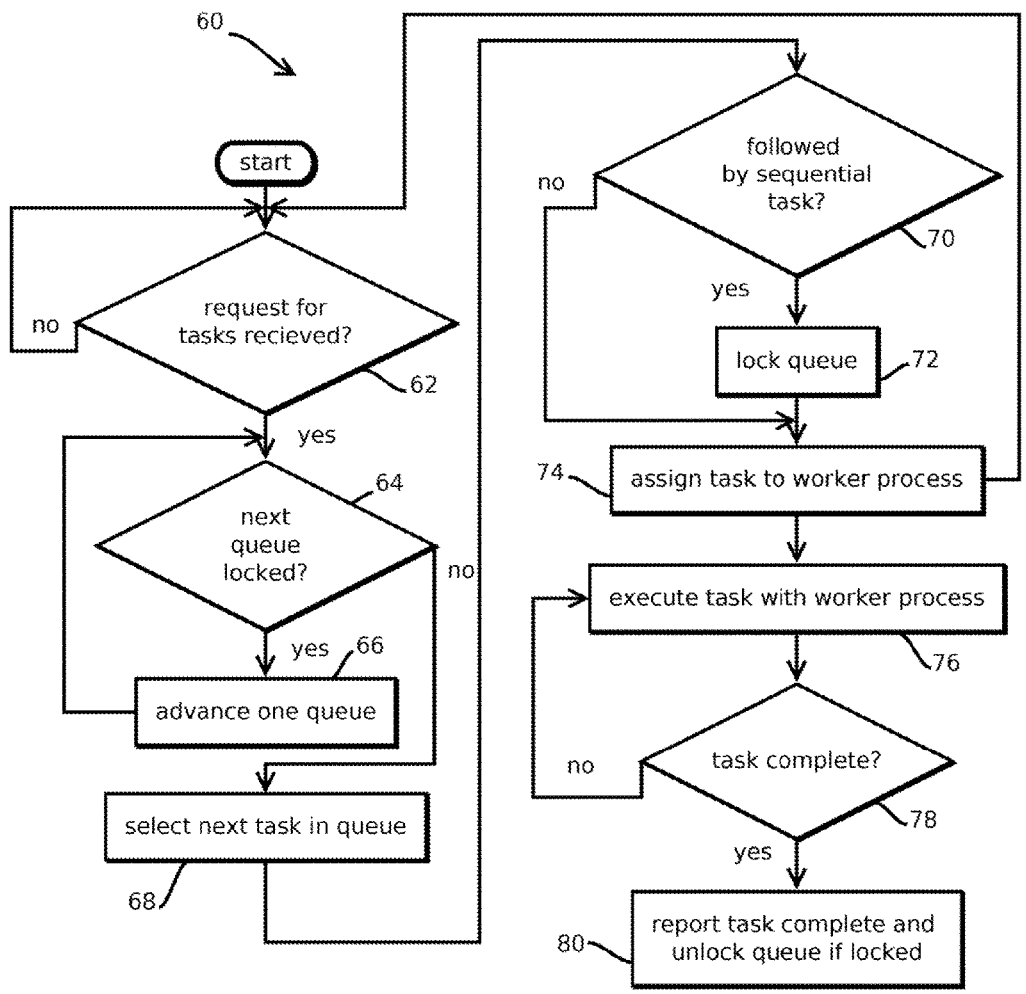
FIG. 3 is a flow chart of an example of a process to execute a mix of ordered and unordered tasks with a distributed workload platform in accordance with some embodiments of the present techniques.

FIG. 3 is a flow chart of an example of a process 60 to execute a mixture of ordered and unordered tasks in a distributed workload processing platform. In some embodiments, the process 60 may be executed by the platform 10 described above with reference to FIG. 1, but embodiments are not limited to that implementation. As with the other processes described herein, some embodiments may be embodied in a tangible, non-transitory, machine-readable medium as instructions that when executed by one or more processors effectuate the operations described herein, and that medium and the processors may be distributed among a plurality of computing devices in some cases. In some embodiments, portions of the process 60 may be executed concurrently, in some cases many instances of portions of this processes may be executed concurrently, while other portions of the process may be executed in a different number of instances concurrently.

In some embodiments, the process 60 may begin with determining whether a request for tasks has been received, as indicated by block 62. In some cases, the step may be performed by the above-described queue list (or by a worker process interrogating the queue list), and tasks may be requested by the worker processes described above. Upon determining that a request has not been received, some embodiments may continue to wait for such a request. Alternatively, upon receiving a request, some embodiments may determine whether a next queue is locked in a queue list, as indicated by block 64. As noted, some embodiments of the queue list may maintain a pointer to a next queue, and operation 64 may include determining whether that next queue is locked. Upon determining that the queue is locked, some embodiments may advance to a next queue, for instance, by incrementing a value of that pointer, like through a circular buffer according to pointers between queues. These operations 64 and 66 may be repeated until an unlocked queue is found, in some cases cycling through a circular buffer multiple times.

Upon determining that the next queue is not locked, some embodiments may select a next task in that queue, as indicated by block 68. In some cases, some embodiments may next determine whether the selected task is followed by a sequential task in an ordered list, as indicated by block 70. Upon determining this to be the case, some embodiments may lock the queue, as indicated by block 72, or in either case, embodiments may then proceed to assign the task to a worker process, as indicated by block 74. Some embodiments may then execute the task with the worker process, as indicated by block 76, while (concurrently and asynchronously) returning to block 62 to await the next request for a task, for instance from another worker process, such that tasks may be assigned to other worker processes while that worker process is executing a given task. Thus, tasks may be assigned and executed concurrently.

Some embodiments may determine whether the task is completed by that worker process, as indicated by block 78, and continue executing until the task is completed. Once the task is completed, some embodiments may report the task as complete and unlock the queue if the queue is locked, as indicated by block 80. Thus, while the task is being executed, if the queue is locked, the queue may remain locked, preventing another task from that queue from being assigned to other worker processes, until the given task is complete. At the same time, some embodiments may concurrently process a relatively large number of other tasks among distributed worker processes, thereby providing both the benefits of concurrent operations while accommodating program instructions with ordered list of tasks.

Figure 4:
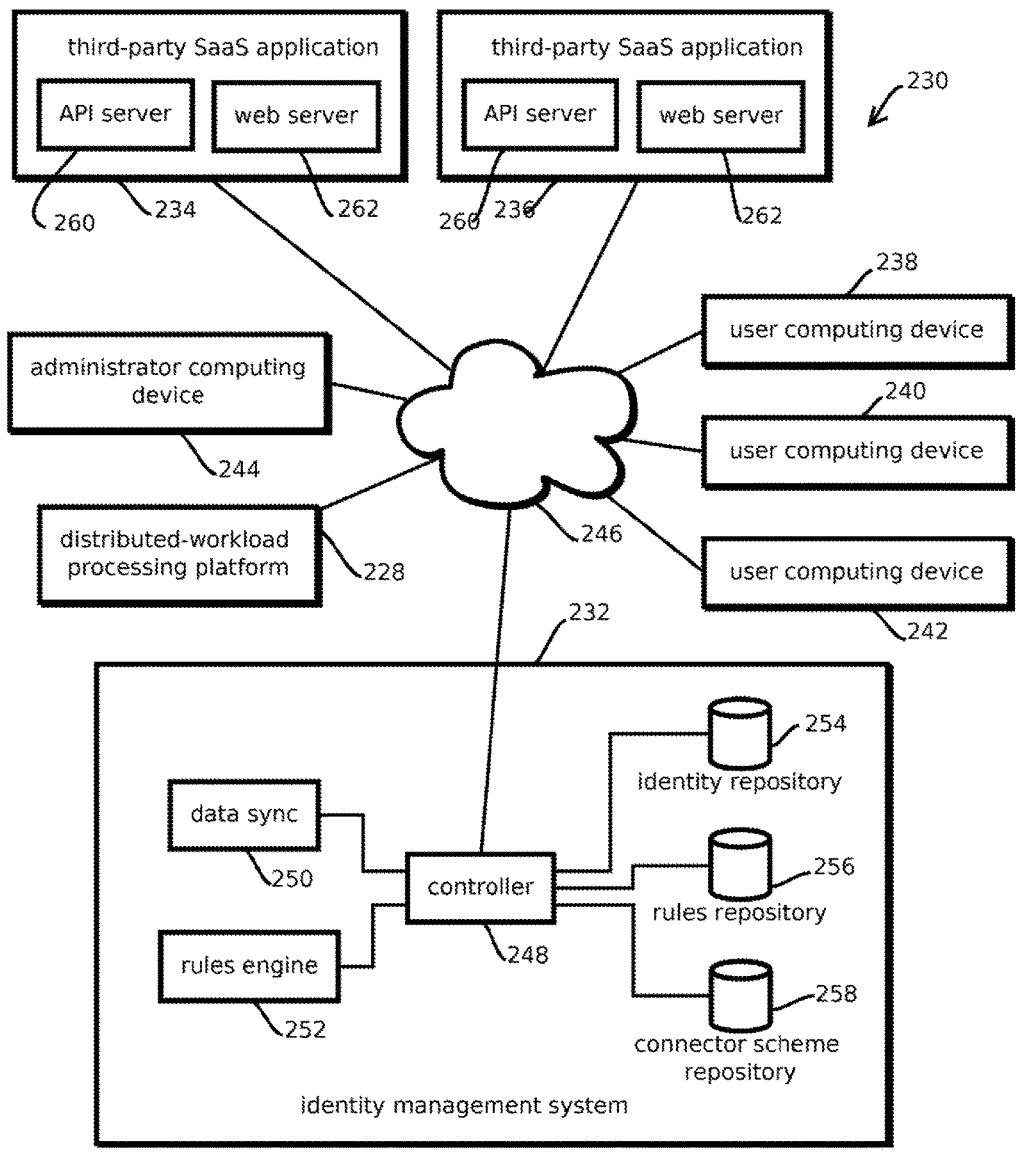
FIG. 4 is a logical architecture of an example of an identity management system that exemplifies the types of applications that may benefit from the techniques of FIGS. 1 through 3.

FIG. 4 is a block diagram of a computing environment 30 in which the above-describe techniques may be implemented, though it should be emphasized that this is one example of a variety of different systems that are expected benefit from the presently described techniques.

As enterprises move their applications to the cloud, and in particular to SaaS applications provided by third parties, it can become very burdensome and complex to manage roles and permissions of employees. For example, a given business may have 20 different subscriptions to 20 different SaaS offerings (like web-based email, customer resource management systems, enterprise resource planning systems, document management systems, and the like). And that business may have 50,000 employees with varying responsibilities in the organization, with employees coming and going and changing roles regularly. Generally, the business would seek to tightly control which employees can access which SaaS services, and often which features of those services each employee can access. For instance, a manager may have permission to add or delete a defect-tracking ticket, while a lower-level employee may only be allowed to add notes or advance state of the ticket in a workflow. Or certain employees may have elevated access to certain email accounts or sensitive human resources related documents. Each time an employee arrives, leaves, or changes roles, different sets of SaaS user accounts may need to be added, deleted, or updated. Thus, many businesses are facing a crisis of complexity, as they attempt to manage roles in permissions across a relatively large organization using a relatively large number of SaaS services with relatively fine-grained feature-access controls.

These issues may be mitigated by some embodiments of the computing environment 230, which includes an identity management system 232 that manages roles and permissions on a plurality of different third-party SaaS applications 234 and 236. In some cases, the SaaS applications may be accessed by users having accounts and various roles, subject to various permissions, on user computing devices 238, 240, or 242, and those accounts may be managed by an administrator operating administrator computing device 244. In some cases, the user computing devices and administrator computing device may be computing devices operated by a single entity, such as a single entity within a single local area network or domain. Or in some cases, the user computing devices 238, 240, and 242 may be distributed among a plurality of different local area networks, for instance, within an organization having multiple networks. In the figure, the number of third-party application servers and user computing devices is two and three respectively, but it should be appreciated that commercial use cases are expected to involve substantially more instances of such devices. Expected use cases involve more than 10 third-party SaaS applications, and in many cases more than 20 or 50 third-party SaaS applications or on-premises applications. Similarly, expected use cases involve more than 1,000 user computing devices, and in many cases more than 10,000 or more than 50,000 user computing devices. In some cases, the number of users is expected to scale similarly, in some cases, with users transitioning into new roles at a rate exceeding 10 per day, and in many commercially relevant use cases, exceeding 100 or 1,000 per day on average. Similarly, versioning of third-party APIs and addition or subtraction of third-party APIs is expected to result in new APIs or new versions of APIs being added monthly or more often in some use cases.

In some embodiments, the user computing devices 238, 240, and 242 may be operated by users accessing or seeking access to the third-party SaaS applications, and administrator computing device 244 may be operated by a system administrator that manages that access. In some embodiments, such management may be facilitated with the identity management system 232, which in some cases, may automatically create, delete, or modify user accounts on various subsets or all of the third-party SaaS applications in response to users being added to, removed from, or moved between, roles in an organization. In some embodiments, each role may be mapped to a plurality of account configurations for the third-party SaaS applications. In some embodiments, in response to a user changing roles, the administrator may indicate that change in roles via the administrator computing device 244, in a transmission to the identity management system 232.

In response to this transmission, the identity management system may retrieve from memory and updated set of account configurations for the user in the new role, and records of these new account configurations may be created in a graph database in the identity management system 232. That graph database and the corresponding records may be synchronized with corresponding third-party applications 234 and 236 to implement the new account configurations, for instance, using the techniques described above, with the illustrated distributed workload processing platform 228 (e.g., the system 10 of FIG. 1). Further, in some cases, a new deployment of the identity management system 232 may contain a graph database populated initially by extracting data from the third-party SaaS applications and translating that data into a canonical format suitable for the graph database using the techniques described above. In some embodiments, the third-party SaaS applications may include an API server 260 and a web server 262.

In some embodiments, each of the third-party SaaS applications are at different domains, having different subnetworks, at different geographic locations, and are operated by different entities. In some embodiments, a single entity may operate multiple third-party SaaS applications, for instance, at a shared data center, or in some cases, a different third-party may host the third-party SaaS applications on behalf of multiple other third parties. In some embodiments, the third-party SaaS applications may be geographically and logically remote from the identity management system 232 and each of the computing devices 238, 240, 242, and 244. In some embodiments, these components 232 through 242 may communicate with one another via various networks, including the Internet 246 and various local area networks.

In some embodiments, the identity management system 232 includes a controller 248, a data synchronization module 250, a rules engine 252, and identity repository 254, a rules repository 256, and a connector schema repository 258. In some embodiments, the controller 248 may direct the system 10 described above with reference to FIG. 1, e.g, via the task tree 16, in some cases by communicating with the various other modules of the identity management system and the other components of the computing environment 230. In some embodiments, the data synchronization module 250 may be configured to synchronize records in the identity repository 254 with records in the third-party SaaS applications, for instance by translating those records at the direction of the controller 248, using the system 10 of FIG. 1. For instance, a user may transfer into a sales group at a company, and the rules may indicate that in the new role, the user is be given a SaaS customer-relationship management account, and that account is to be added in the SaaS application to a group corresponding to a geographic sales region. These may lead to sequential tasks, where the account needs to be created via the API, before the API can be commanded to add the account to a group.

In some embodiments, the rules engine 252 may be configured to update the identity repository 254 based on rules in the rules repository 256 to determine third-party SaaS application account configurations based on changes in roles of users, for instance received from the administrator computing device 244, at the direction of controller 248. In some embodiments, the administrator computing device 244 may send a command to transition a user from a first role to a second role, for instance, a command indicating the user has moved from a first-level technical support position to a management position. In response, the controller 248 may retrieve a set of rules (which may also be referred to as a "policy") corresponding to the former position and a set of rules corresponding to the new position from the rules repository 246. In some embodiments, these sets of rules may indicate which SaaS applications should have accounts for the corresponding user/role and configurations of those accounts, like permissions and features to enable or disable. In some embodiments, these rules may be sent to the rules engine 252, which may compare the rules to determine differences from a current state, for instance, configurations to change or accounts to add or remove. In some embodiments, the rules engine 252 may update records in the identity repository 254 to indicate those changes, for instance, removing accounts, changing groups to which users belong, changing permissions, adding accounts, removing users from groups, and the like. In some cases, applying the rules may be an example of unordered tasks performed by the system 10 above. In some embodiments, these updates may be updates to a graph data structure, like the examples described above. In some embodiments, the graph data structure may be a neo4j graph database available from Neo Technology, Inc. of San Mateo, Calif. In some embodiments, the controller 248 may respond to these updates by instructing the data sync module 252 translate the modified nodes and edges into API commands, using a variant of the system 10 of FIG. 1 send those API commands to the corresponding third-party SaaS applications.

In some embodiments, the identity repository 254 may include a graph data structure indicating various entities and relationships between those entities that describe user accounts, user roles within an organization, and the third-party SaaS applications. For instance, some embodiments may record as entities in the graph data structure the third-party SaaS applications, accounts of those applications, groups of user accounts (in some cases in a hierarchical taxonomy), groups of users in an organization (again, in some cases in a hierarchical taxonomy, like an organizational structure), user accounts, and users. Each of these nodes may have a variety of attributes, like the examples described above, e.g., user names for user accounts, user identifiers for users, group names, and group leaders for groups, and the like. In some embodiments, the graph data structure may be a neo4j graph database available from Neo Technology, Inc. of San Mateo, Calif.

In some embodiments, these nodes may be related to one another through various relationships that may be encoded as edges of the graph. For instance, an edge may indicate that a user is a member of a subgroup, and that that subgroup is a member of a group of subgroups. Similarly, and edge may indicate that a user has an account, and that the account is a member of a group of accounts, like a distribution list. In some examples, and edge may indicate that an account is with a SaaS application, with the respective edge linking between a node corresponding to the particular account and another node corresponding to the SaaS application. In some embodiments, multiple SaaS applications may be linked by edges to a node corresponding to a given party, such as a third-party.

In some embodiments, this data structure is expected to afford relatively fast operation by computing systems for certain operations expected to be performed relatively frequently by the identity management system 232. For instance, some embodiments may be configured to relatively quickly query all accounts of the user by requesting all edges of the type "has_an_account" connected to the node corresponding to the user, with those edges identifying the nodes corresponding to the respective accounts. In another example, all members of a group may be retrieved relatively quickly by requesting all nodes connected to a node correspond to the group by an edge that indicates membership. Thus, the graph data structure may afford relatively fast operation compared to many traditional systems based on relational databases in which such relationships are evaluated by cumbersome join operations extending across several tables or by maintaining redundant indexes that slow updates. (Though, embodiments are also consistent with use of relational databases instead of graph databases, as multiple, independently useful techniques are described).

Some embodiments of the identity management system implement techniques to translate between heterogenous APIs and a canoncial database, as described in a U.S. patent application Ser. No. 15/433,300 titled MAPPING HETEROGENEOUS APPLICATION-PROGRAM INTERFACES TO A DATABASE, filed on the same day as this filing, the contents of which are hereby incorporated by reference.

Some embodiments of the identity management system may implement techniques to organize schemas for a graph database within a set of hierarchical documents that define polymorphic schemas with inheritance described, as described in a U.S. patent application Ser. No. 15/433,360 titled SCHEMAS TO DECLARE GRAPH DATA MODELS, filed on the same day as this filing, the contents of which are hereby incorporated by reference.

Some embodiments of the identity management system may implement techniques to process a dynamic API request that accommodates different contexts of different requests corresponding to different graph database schemas, as described in a U.S. patent application Ser. No. 15/433,425 titled EXPOSING DATABASES VIA APPLICATION PROGRAM INTERFACES, filed on the same day as this filing, the contents of which are hereby incorporated by reference.

Some embodiments of the identity management system may implement techniques to implement homomorphic translation programs for translating between schemas, as described in a U.S. patent application Ser. No. 15/433,449 titled SELF-RECOMPOSING PROGRAM TO TRANSFORM DATA BETWEEN SCHEMAS, filed on the same day as this filing, the contents of which are hereby incorporated by reference.

Figure 5:
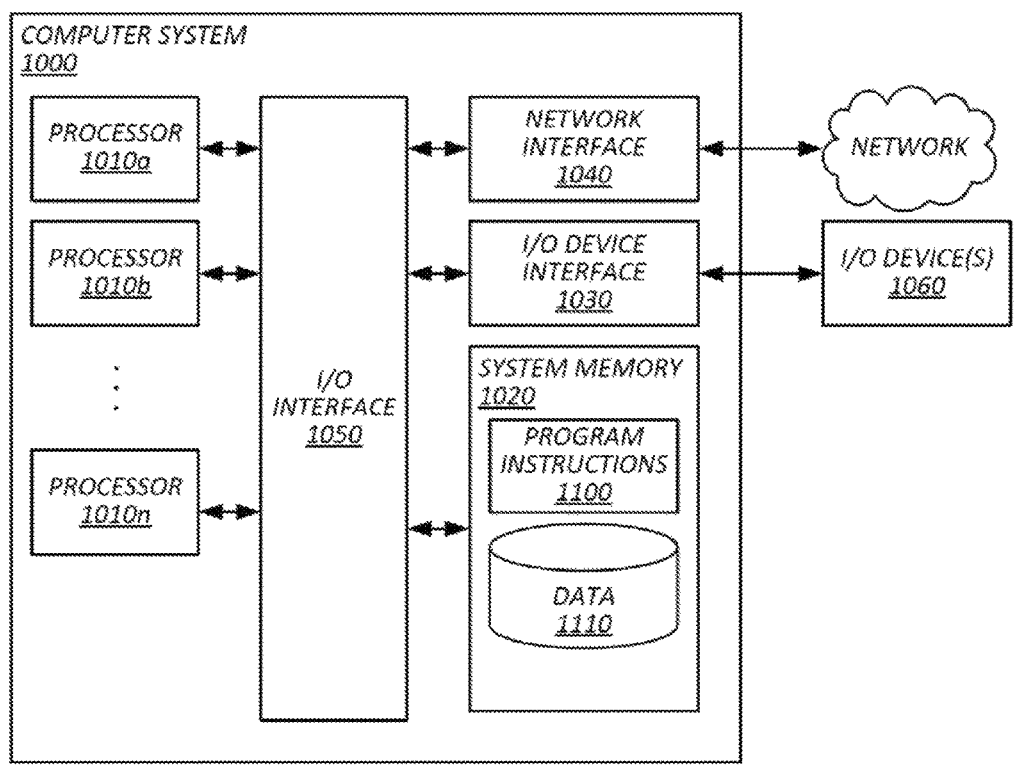
FIG. 5 is a block diagram of an example of a computer system by which the above techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, the inventors have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the disclosed techniques to the particular form disclosed, but to the contrary, the intention is to cover all modifications, equivalents, and alternatives falling within the spirit and scope of the present disclosed techniques as defined by the appended claims. Further modifications and alternative embodiments of various aspects of the disclosed techniques will be apparent to those skilled in the art in view of this description. Accordingly, this description and the drawings are to be construed as illustrative only and are for the purpose of teaching those skilled in the art the general manner of carrying out the disclosed techniques. Elements and materials may be substituted for those illustrated and described herein, parts and processes may be reversed or omitted, and certain features of the disclosed techniques may be utilized independently, all as would be apparent to one skilled in the art after having the benefit of this description. Changes may be made in the elements described herein without departing from the spirit and scope of the disclosed techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated clauses:

1. A method, comprising: obtaining, with one or more processors, a task tree, the task tree including a plurality of tasks arranged in a tree data structure; traversing, with one or more processors, the task tree to obtain an unordered set of tasks and an ordered list of tasks; adding, with one or more processors, the unordered set of tasks to at least some of a plurality of queues of tasks; adding, with one or more processors, the ordered list of tasks to at least some of the plurality of queues of tasks; receiving, with one or more processors, a first task request from a first worker process among a plurality of worker processes in a concurrent processing application distributed among multiple processors and, in response to the first task request; accessing a first queue from among the plurality of queues; determining that the first queue is not locked; accessing a first task in the first queue in response to the first task being a next task in the first queue; and determining that the first task is a member of a sequence of tasks specified by the ordered list and, in response, locking the first queue; and assigning the first task to the first worker process; receiving, with one or more processors, a second task request from a second worker process among the plurality of worker processes, the second worker process being a different process from the first worker process, and, in response to the second task request; accessing the first queue; determining that the first queue is locked and, in response, accessing a second queue from among the plurality of queues; accessing a second task in the second queue in response to the second task being a next task in the second queue; determining that the second task is a member of the unordered set of tasks and, in response, determining to not lock the second queue; and assigning the second task to the second worker process.

2. The method of embodiment 1, comprising: receiving confirmation from the first worker process that the first task is complete and, in response, unlocking the first queue; receiving a third task request from a third worker process among the plurality of worker processes, the third worker process being a different process from the first worker process and the second worker process, and, in response to the third task request: accessing the first queue from among the plurality of queues; determining that the first queue is not locked; accessing a third task in the first queue in response to the third task being a next task in the first queue, the third task consecutively following the first task in the ordered list of tasks; and assigning the third task to the third worker process.

3. The method of embodiment 2, comprising: determining that the third task is a final task of the ordered list and, in response, determining to not lock the first queue; receiving a fourth task request from a fourth worker process among the plurality of worker processes and, in response to the fourth task request; accessing the first queue; determining that the first queue is not locked and, in response, assigning a fourth task from the first queue to the fourth worker process, wherein: the first task and the third task are not executed concurrently; the first task and the second task are executed concurrently; and the third task and the fourth task are executed concurrently.

4. The method of any of embodiments 1-3, comprising: obtaining a result of the first task or the second task; and based on the result, expanding the task tree to include additional tasks.

5. The method of embodiment 4, wherein expanding the task tree to include additional tasks comprises: adding child nodes to a node of the tree corresponding to the task from which the result is obtained; and adding the additional tasks to at least some of the plurality of queues.

6. The method of any of embodiments 1-5, wherein: traversing the task tree comprises traversing the task tree with a depth-first traversal, wherein the task tree is expanded to include additional child nodes of a current node based on a result produced by the current node.

7. The method of embodiment 6, wherein the task tree is expanded before advancing to a subsequent node following a current node.

8. The method of any of embodiments 1-7, wherein the plurality of queues comprise: a first plurality of first-in-first-out lists having at least some tasks designated as suitable for concurrent processing relative to one another; and a second plurality of first-in-first-out lists having at least some tasks designated as unsuitable for concurrent processing relative to one another.

9. The method of any of embodiments 1-8, wherein the plurality of queues comprises a queue comprising: a first subset of tasks to be executed concurrently with one another by the worker processes; and a second subset of tasks to be executed sequentially relative to one another by the worker processes.

10. The method of embodiment 9, wherein different worker processes process different ones of at least some of the second subset of tasks on different processors in different computers.

11. The method of any of embodiments 1-10, wherein each task in the plurality of queues is associated with a value indicating whether the respective task must be completed before a subsequent task in the respective queue is processed.

12. The method of any of embodiments 1-11, wherein: the plurality of queues are stored in a key-value store supporting atomic operations to push and pop tasks onto respective lists, the atomic operations being respective single program instructions that are completed before a next instruction in the program is executed.

13. The method of embodiment 12, wherein: the atomic operations include determining whether to lock the respective queue.

14. The method of any of embodiments 1-13, wherein: the worker nodes are persistent between tasks processed by the respective worker nodes.

15. The method of any of embodiments 1-14, comprising: steps for executing tasks concurrently with a distributed application, wherein: traversing the task tree comprises steps for traversing a task tree; and adding the unordered set of tasks to at least some of a plurality of queues of tasks comprises steps for adding tasks to queues.

16. The method of any of embodiments 1-15, comprising: providing a user-facing application based on results of processing the tasks.

17. The method of any of embodiments 1-16, comprising: obtaining changes to roles of individuals in an organization, at least some of the changes specifying an individual, a role before the change, and a role after the change; generating at least part of the task tree by applying to the changes a plurality of rules indicating accounts and permissions on a plurality of third party software-as-a-service (SaaS) applications associated with roles.

18. The method of embodiment 17, wherein: for a given individual and a given role after the changes for the given individual, the rules specify a new third-party SaaS account for the given individual and a new group membership for the new third-party SaaS account; generating at least part of the task tree comprises generating an ordered list of tasks that includes a first-given task of instructing an application program interface (API) of the specified SaaS application to add an account for the given individual and a second-given task, to be performed after the first-given task is complete, of instructing the API of the specified SaaS application to add the account to a group of accounts.

19. The method of any of embodiments 1-18, wherein: the unordered set of tasks or the ordered list of tasks includes tasks executed by different worker nodes executing different worker processes and interfacing with the same API of the same SaaS application, wherein the tasks executed by the different worker nodes include session-less exchanges with the API, the different worker nodes including the same access token in API requests, the access token being obtained from an authorization server that is a different server from a server of the API.

20. A system, comprising: one or more processors; and memory storing instructions that when executed by at least some of the processors effectuate operations comprising: the operations of any of embodiments 1-19.

21. A tangible, non-transitory, machine-readable medium storing instructions that when executed by a data processing apparatus cause the data processing apparatus to perform operations comprising: the operations of any of embodiments 1-19.

What is claimed is:

1. A method, comprising:
obtaining, with one or more processors, a task tree, the task tree including a plurality of tasks arranged in a tree data structure;
traversing, with one or more processors, the task tree to obtain an unordered set of tasks and an ordered list of tasks;
adding, with one or more processors, the unordered set of tasks to at least some of a plurality of queues of tasks;
adding, with one or more processors, the ordered list of tasks to at least some of the plurality of queues of tasks;
receiving, with one or more processors, a first task request from a first worker process among a plurality of worker processes in a concurrent processing application distributed among multiple processors and, in response to the first task request:
accessing a first queue from among the plurality of queues,
determining that the first queue is not locked,
accessing a first task in the first queue in response to the first task being a next task in the first queue,
determining that the first task is a member of a sequence of tasks specified by the ordered list and, in response, locking the first queue, and
assigning the first task to the first worker process; and
receiving, with one or more processors, a second task request from a second worker process among the plurality of worker processes, the second worker process being a different process from the first worker process, and, in response to the second task request:
accessing the first queue,
determining that the first queue is locked and, in response, accessing a second queue from among the plurality of queues,
accessing a second task in the second queue in response to the second task being a next task in the second queue,
determining that the second task is a member of the unordered set of tasks and, in response, determining to not lock the second queue, and
assigning the second task to the second worker process.

2. The method of claim 1, comprising:
receiving confirmation from the first worker process that the first task is complete and, in response, unlocking the first queue; and
receiving a third task request from a third worker process among the plurality of worker processes, the third worker process being a different process from the first worker process and the second worker process, and, in response to the third task request:
accessing the first queue from among the plurality of queues,
determining that the first queue is not locked,
accessing a third task in the first queue in response to the third task being a next task in the first queue, the third task consecutively following the first task in the ordered list of tasks, and
assigning the third task to the third worker process.

3. The method of claim 2, comprising:
determining that the third task is a final task of the ordered list and, in response, determining to not lock the first queue; and
receiving a fourth task request from a fourth worker process among the plurality of worker processes and, in response to the fourth task request:
accessing the first queue, and
determining that the first queue is not locked and, in response, assigning a fourth task from the first queue to the fourth worker process,
wherein:
the first task and the third task are not executed concurrently,
the first task and the second task are executed concurrently, and
the third task and the fourth task are executed concurrently.

4. The method of claim 1, comprising:
obtaining a result of the first task or the second task; and based on the result, expanding the task tree to include additional tasks.

5. The method of claim 4, wherein expanding the task tree to include additional tasks comprises:
adding child nodes to a node of the tree corresponding to the task from which the result is obtained; and
adding the additional tasks to at least some of the plurality of queues.

6. The method of claim 1, wherein:
traversing the task tree comprises traversing the task tree with a depth-first traversal, wherein the task tree is expanded to include additional child nodes of a current node based on a result produced by the current node.

7. The method of claim 6, wherein the task tree is expanded before advancing to a subsequent node following a current node.

8. The method of claim 1, wherein the plurality of queues comprise:
a first plurality of first-in-first-out lists having at least some tasks designated as suitable for concurrent processing relative to one another; and
a second plurality of first-in-first-out lists having at least some tasks designated as unsuitable for concurrent processing relative to one another.

9. The method of claim 1, wherein the plurality of queues comprises a queue comprising:
a first subset of tasks to be executed concurrently with one another by the worker processes; and
a second subset of tasks to be executed sequentially relative to one another by the worker processes.

10. The method of claim 9, wherein different worker processes process different ones of at least some of the second subset of tasks on different processors in different computers.

11. The method of claim 1, wherein each task in the plurality of queues is associated with a value indicating whether the respective task must be completed before a subsequent task in the respective queue is processed.

12. The method of claim 1, wherein:
the plurality of queues are stored in a key-value store supporting atomic operations to push and pop tasks onto respective lists, the atomic operations being respective single program instructions that are completed before a next instruction in the program is executed.

13. The method of claim 12, wherein:
the atomic operations include determining whether to lock the respective queue.

14. The method of claim 1, wherein:
the worker nodes are persistent between tasks processed by the respective worker nodes.

15. The method of claim 1, comprising:
steps for executing tasks concurrently with a distributed application,
wherein:
traversing the task tree comprises steps for traversing a task tree; and
adding the unordered set of tasks to at least some of a plurality of queues of tasks comprises steps for adding tasks to queues.

16. The method of claim 1, comprising:
providing a user-facing application based on results of processing the tasks.

17. The method of claim 1, comprising:
obtaining changes to roles of individuals in an organization, at least some of the changes specifying an individual, a role before the change, and a role after the change; and
generating at least part of the task tree by applying to the changes a plurality of rules indicating accounts and permissions on a plurality of third party software-as-a-service (SaaS) applications associated with roles.

18. The method of claim 17, wherein:
for a given individual and a given role after the changes for the given individual, the rules specify a new third-party SaaS account for the given individual and a new group membership for the new third-party SaaS account;
generating at least part of the task tree comprises generating an ordered list of tasks that includes a first-given task of instructing an application program interface (API) of the specified SaaS application to add an account for the given individual and a second-given task, to be performed after the first-given task is complete, of instructing the API of the specified SaaS application to add the account to a group of accounts.

19. The method of claim 1, wherein:
the unordered set of tasks or the ordered list of tasks includes tasks executed by different worker nodes executing different worker processes and interfacing with the same API of the same SaaS application, wherein the tasks executed by the different worker nodes include session-less exchanges with the API, the different worker nodes including the same access token in API requests, the access token being obtained from an authorization server that is a different server from a server of the API.

20. A system, comprising:
one or more processors; and
memory storing instructions that when executed by at least some of the processors effectuate operations comprising:
obtaining, with one or more processors, a task tree, the task tree including a plurality of tasks arranged in a tree data structure;
traversing, with one or more processors, the task tree to obtain an unordered set of tasks and an ordered list of tasks;
adding, with one or more processors, the unordered set of tasks to at least some of a plurality of queues of tasks;
adding, with one or more processors, the ordered list of tasks to at least some of the plurality of queues of tasks;
receiving, with one or more processors, a first task request from a first worker process among a plurality of worker processes in a concurrent processing application distributed among multiple processors and, in response to the first task request:
accessing a first queue from among the plurality of queues,
determining that the first queue is not locked,
accessing a first task in the first queue in response to the first task being a next task in the first queue,
determining that the first task is a member of a sequence of tasks specified by the ordered list and, in response, locking the first queue, and
assigning the first task to the first worker process; and
receiving, with one or more processors, a second task request from a second worker process among the plurality of worker processes, the second worker process being a different process from the first worker process, and, in response to the second task request;
  accessing the first queue,
  determining that the first queue is locked and, in response, accessing a second queue from among the plurality of queues,
  accessing a second task in the second queue in response to the second task being a next task in the second queue,
  determining that the second task is a member of the unordered set of tasks and, in response, determining to not lock the second queue, and
  assigning the second task to the second worker process.

21. The system of claim 20, the operations comprising:
receiving confirmation from the first worker process that the first task is complete and, in response, unlocking the first queue; and
receiving a third task request from a third worker process among the plurality of worker processes, the third worker process being a different process from the first worker process and the second worker process, and, in response to the third task request:
  accessing the first queue from among the plurality of queues,
  determining that the first queue is not locked,
  accessing a third task in the first queue in response to the third task being a next task in the first queue, the third task consecutively following the first task in the ordered list of tasks, and
  assigning the third task to the third worker process.

22. The system of claim 21, the operations comprising:
determining that the third task is a final task of the ordered list and, in response, determining to not lock the first queue; and
receiving a fourth task request from a fourth worker process among the plurality of worker processes and, in response to the fourth task request:
  accessing the first queue, and
  determining that the first queue is not locked and, in response, assigning a fourth task from the first queue to the fourth worker process,
wherein:
  the first task and the third task are not executed concurrently,
  the first task and the second task are executed concurrently, and
  the third task and the fourth task are executed concurrently.

23. The system of claim 20, the operations comprising:
obtaining a result of the first task or the second task; and
based on the result, expanding the task tree to include additional tasks.

24. The system of claim 20, the operations comprising:
obtaining changes to roles of individuals in an organization, at least some of the changes specifying an individual, a role before the change, and a role after the change;
generating at least part of the task tree by applying to the changes a plurality of rules indicating accounts and permissions on a plurality of third party software-as-a-service (SaaS) applications associated with roles.

* * * * *